(12) United States Patent
Wamble, III et al.

(10) Patent No.: US 11,890,946 B2
(45) Date of Patent: Feb. 6, 2024

(54) LEVITATION CONTROL SYSTEM FOR A TRANSPORTATION SYSTEM

(71) Applicant: SKYTRAN, INC., Irvine, CA (US)

(72) Inventors: John Lee Wamble, III, Bothell, WA (US); John Cole, Dana Point, CA (US); Clark B. Foster, Mission Viejo, CA (US)

(73) Assignee: SKYTRAN, INC., Irvine, CA (US)

( * ) Notice: Subject to any disclaimer, the term of this patent is extended or adjusted under 35 U.S.C. 154(b) by 478 days.

(21) Appl. No.: 16/995,788

(22) Filed: Aug. 17, 2020

(65) Prior Publication Data
US 2020/0376965 A1 Dec. 3, 2020

Related U.S. Application Data

(63) Continuation of application No. 15/509,485, filed as application No. PCT/US2015/049019 on Sep. 8, 2015, now Pat. No. 10,744,887.
(Continued)

(51) Int. Cl.
*B60L 13/04* (2006.01)
*B60L 13/06* (2006.01)
(Continued)

(52) U.S. Cl.
CPC ............. *B60L 13/06* (2013.01); *B60L 13/003* (2013.01); *B60L 13/04* (2013.01); *B60L 13/10* (2013.01);
(Continued)

(58) Field of Classification Search
CPC ........ B60L 13/003; B60L 13/04; B60L 13/06; B60L 13/08; B60L 13/10; B60L 2200/26;
(Continued)

(56) References Cited

U.S. PATENT DOCUMENTS 3,903,809 A 9/1975 Miericke et al.
4,408,139 A * 10/1983 Schwarzler .......... H02K 41/025
310/13
(Continued)

FOREIGN PATENT DOCUMENTS

JP S6096170 A 5/1985
JP S6231303 A 2/1987
(Continued)

OTHER PUBLICATIONS

International Search Report and Written Opinion by the International Searching Authority for the corresponding International Patent Application PCT/US2015/049019, dated Dec. 17, 2015, 10 pages.
(Continued)

*Primary Examiner* — Mark T Le
(74) *Attorney, Agent, or Firm* — Polsinelli PC

(57) ABSTRACT

Transport apparatus having at least one levitation generator and at least one drive generator. The at least one levitation generator configured to generate a levitating magnetic flux, move within a corresponding at least one lifting member, and elevate above a rest position relative to the at least one lifting member in response to the levitating magnetic flux. The at least one drive generator configured to generate a driving magnetic flux, move within a corresponding at least one drive member, and laterally move relative to the at least one drive member in response to the driving magnetic flux. At least a portion of the at least one levitation generator is movable relative to the at least one drive generator.

15 Claims, 13 Drawing Sheets

Related U.S. Application Data

(60) Provisional application No. 62/047,624, filed on Sep. 8, 2014.

(51) Int. Cl.

| | | |
|---|---|---|
| *B60L 13/00* | (2006.01) | |
| *B60L 13/10* | (2006.01) | |
| *B61B 13/08* | (2006.01) | |
| *E01B 25/30* | (2006.01) | |
| *B60L 13/08* | (2006.01) | |

(52) U.S. Cl.
CPC .............. *B61B 13/08* (2013.01); *E01B 25/30* (2013.01); *B60L 13/08* (2013.01); *B60L 2200/26* (2013.01)

(58) Field of Classification Search
CPC ...... B60L 15/005; B60L 13/03; B60L 15/002; B61B 13/08; E01B 25/30
See application file for complete search history.

(56) References Cited

U.S. PATENT DOCUMENTS

| | | | |
|---|---|---|---|
| 4,585,282 A | | 4/1986 | Bosley |
| 4,646,651 A | * | 3/1987 | Yamamura .............. B60L 13/10 |
| | | | 104/286 |
| 5,253,592 A | * | 10/1993 | Coffey .................... B60L 13/10 |
| | | | 104/286 |
| 5,270,593 A | * | 12/1993 | Levi ........................ B60L 13/10 |
| | | | 104/282 |
| 5,666,883 A | | 9/1997 | Kuznetsov |
| 6,374,746 B1 | * | 4/2002 | Fiske ..................... B61B 13/08 |
| | | | 104/282 |
| 6,684,794 B2 | * | 2/2004 | Fiske ..................... B60L 13/04 |
| | | | 104/286 |
| 7,562,628 B2 | | 7/2009 | Wamble, III |
| 9,610,509 B2 | | 4/2017 | Vance |
| 10,744,887 B2 | * | 8/2020 | Wamble, III ........... B60L 13/06 |
| 2003/0015115 A1 | | 1/2003 | Lamb et al. |
| 2007/0089636 A1 | | 4/2007 | Guardo, Jr. |
| 2014/0130703 A1 | | 5/2014 | Wamble, III |

FOREIGN PATENT DOCUMENTS

| | | |
|---|---|---|
| JP | H05328538 A | 12/1993 |
| TW | 201311486 A | 3/2013 |
| WO | WO 03/091132 | 11/2003 |
| WO | WO 2007/119315 A1 | 10/2007 |
| WO | WO 2010/022637 A1 | 3/2010 |
| WO | WO 2016/040374 | 3/2016 |

OTHER PUBLICATIONS

Extended European Search Report from the European Patent Office, dated Apr. 9, 2018, 8 pages, for the corresponding European Patent Application No. 15839173.0.

English translation of the first Office Action from the National Intellectual Property Administration, PRC, dated Jan. 3, 2019, 3 pages, for the corresponding Chinese Patent Application No. 201580060509.8.

Office Action (including English Translation of listed Cited References) dated Apr. 11, 2019, for the corresponding Taiwanese Application No. 104129653 in 12 total pages.

Office Action (including English Translation) dated Jan. 4, 2019, for the corresponding Chinese Application No. 201580060509.8 in 15 total pages.

English Translation of Office Action dated Aug. 17, 2021, for the corresponding Japanese Application No. 2020-115009 in 5 pages.

* cited by examiner

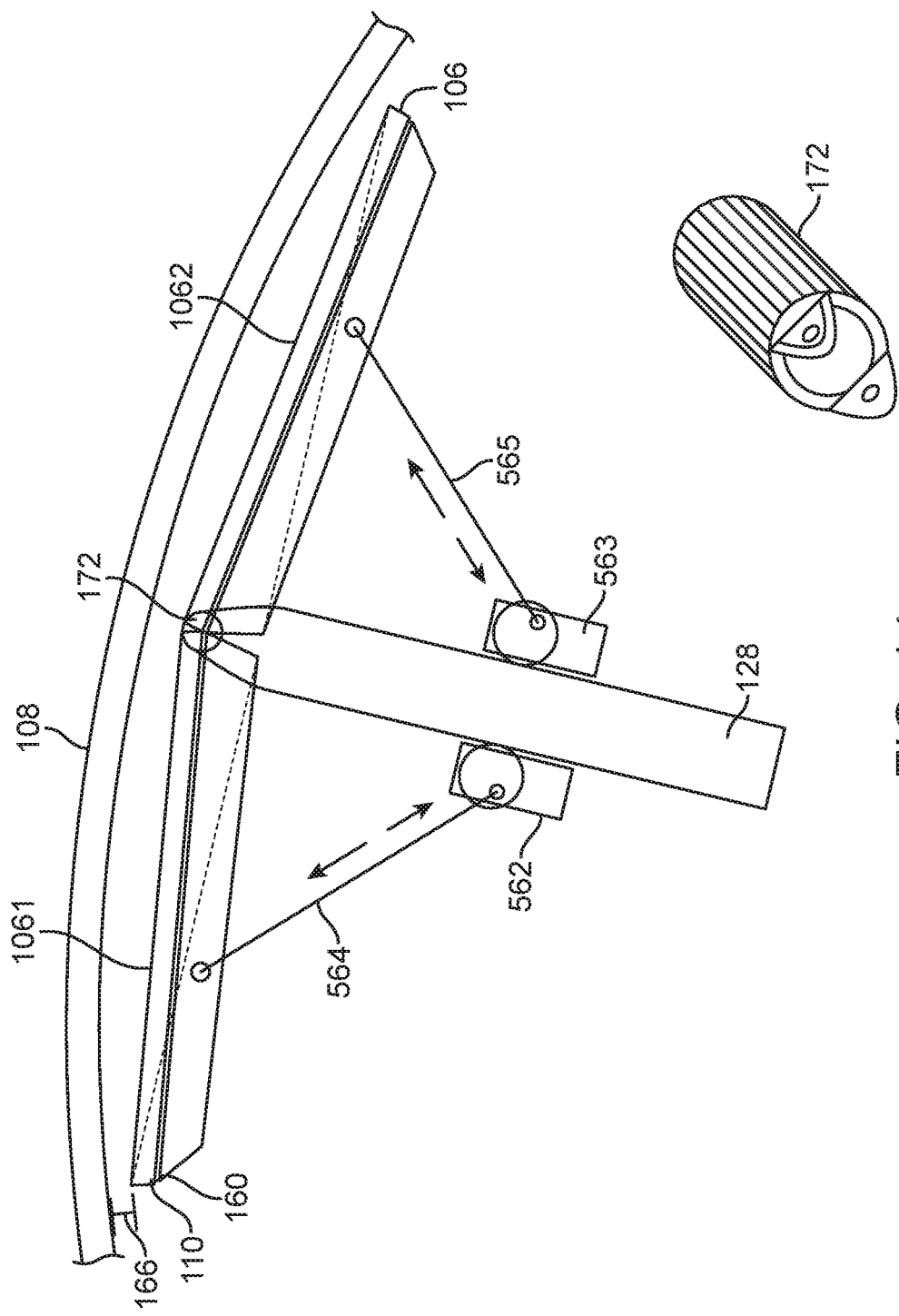

LEVITATION CONTROL SYSTEM FOR A TRANSPORTATION SYSTEM

CROSS REFERENCE TO RELATED APPLICATION

This application is a Continuation of U.S. application Ser. No. 15/509,485, filed Mar. 7, 2017, which is a U.S. National Stage Entry of PCT Application No. PCT/US2015/049019, filed Sep. 8, 2015, which claims the benefit of U.S. Provisional Application No. 62/047,624 filed Sep. 8, 2014, the contents of which are entirely incorporated by reference herein.

FIELD

The subject matter herein is directed to a levitation system for a transportation system and more specifically to a levitation system for transportation systems that can include a drive system.

BACKGROUND

Magnetic levitation systems have been designed in general as systems that levitate through the use of attraction or repulsion between two objects. These magnetic levitation systems are dependent upon the spacing of the two objects such that if the spacing of the two objects changes, the forces produced by the magnets on each of the objects change. Furthermore, in systems that implement magnetic levitation via a track, for example on trains, requires that the track be substantially level. Thus, if the ground shifts over time because of weather or weight of the train and track, the track will have to be repaired.

Magnetic levitation can provide advantages compared to conventional wheels on tracks. Generally, magnetic levitation has low or zero mechanical friction and thus parts in levitation systems do not wear from contact. Magnetic levitation has a wide range of speeds over which it can operate, and in operation it generates relatively low noise levels.

Magnetic levitation can be applied to traditional large train system architecture as well as monorail or personal rapid transport (PRT) systems. Magnetic levitation can use active or passive magnetic interaction for levitation and centering functions, and can use inductive or synchronous magnetic interaction for propulsion. For example, a networked guideway transit system can use permanent magnet coupling to provide primary lift passively with motion, and can use electrodynamic repulsion to create centering forces at most operational speeds while integrating linear motor functions with electrodynamic centering functions. See, for example, Wamble, III et al. U.S. Pat. No. 7,562,628 issued Jul. 21, 2009, incorporated herein by reference, and Wamble, III et al. U.S. Pat. No. 8,171,858 issued May 8, 2012, incorporated herein by reference. A propulsion or drive unit can be either integrated with or separate from a levitation unit.

For example, a propulsion unit separate from the levitation unit is described in Wamble III, International Publication WO 2013/003387 A2 published 3 Jan. 3, 2013, incorporated herein by reference. A vehicle can be levitated by one or more of the levitation units (for example, 410 in FIGS. 2, 3, 4, 9, 10, 11A, 11B of WO 2013/003387 A2), and each levitation unit has one or more elongated magnetic poles. When the vehicle engages a track, each elongated magnetic pole is adjacent to a flat vertical surface of a stationary electrically conductive rail of the track, and the elongated magnetic pole is inclined at a variable angle. When the elongated magnetic pole moves along the rail, the magnetic field from the elongated magnetic pole induces eddy currents in the rail, and the eddy currents in the rail produce lift upon the elongated magnetic pole. Under some typical operating conditions, the lift is generally proportional to the angle of inclination and the velocity of the vehicle. (See paragraphs [0066] to of WO 2013/003387 A2.)

BRIEF DESCRIPTION OF THE DRAWINGS

Implementations of the present technology will now be described, by way of example only, with reference to the attached figures, wherein:

FIG. 14 is a diagrammatic view of a pivotable levitation generator coupled to an axle and a corresponding lifting member according to an exemplary embodiment;

FIG. 15 is an isometric view of an axle coupling according to an exemplary embodiment.

Figure 1:
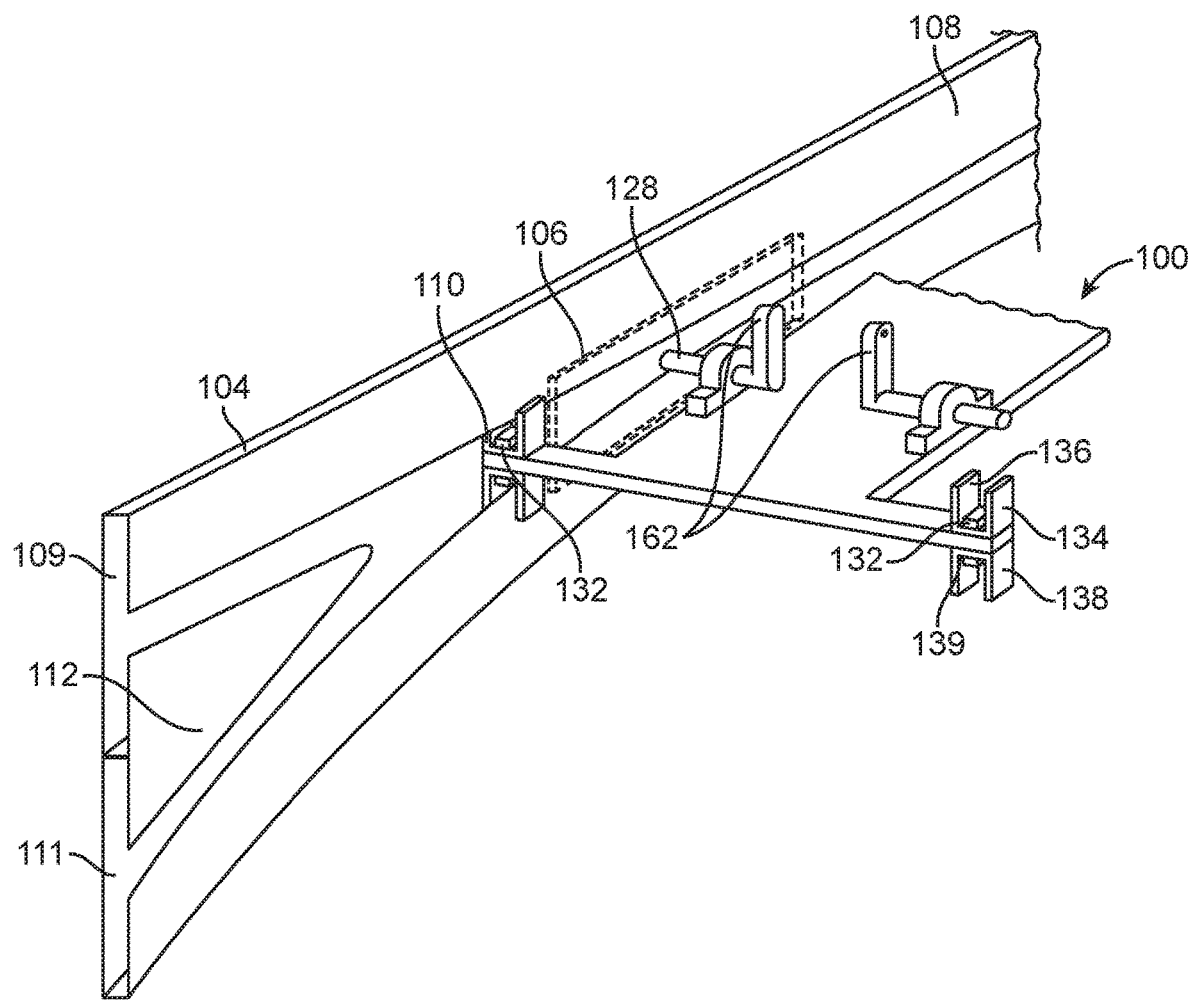
FIG. 1 is an isometric view of a transport apparatus including a levitation generator and a guideway having a junction according to an exemplary embodiment.

The various embodiments described above are provided by way of illustration only and should not be construed to limit the scope of the disclosure. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached claims. It will therefore be appreciated that the embodiments described above can be modified within the scope of the appended claims. Claim language reciting "at least one of" a set indicates that one member of the set or multiple members of the set satisfy the claim.

DETAILED DESCRIPTION

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The term "levitation" as used herein refers to the lifting and suspension of an object relative to another object in the absence of a mechanical contact between the objects. "Levitation force" is a force that provides for levitation. The levitation force can act in a vertical direction (the direction opposite the direction of gravity), but those skilled in the art will readily recognize that the same force can be used to move or position two objects in a lateral direction or in some direction with both vertical and lateral components. To generalize, the terms "levitation" and "levitation force" as used herein refer, respectively, to contactless positioning and a force between two objects in a direction substantially orthogonal to the primary direction of travel. As further used herein, "levitation magnetic flux" and "levitation force" are interchangeable and refer to the same element. A "levitation generator" is a device that is configured to generate magnetic waves that interact with a lifting member to levitate the movable object with respect to the stationary object.

"Drive force" refers to the force required to accelerate, maintain motion or decelerate one object with respect to another. As used herein, "drive force" means a force substantially in line with the primary direction of travel, effected without mechanical contact between the two objects. As further used herein, "drive magnetic flux" and "drive force" are interchangeable and refer to the same element. A "drive generator" is a device that is configured to generate magnetic waves that interact with a drive member to drive the movable object with respect to the stationary object.

A "guideway" is a device or structure that provides for a path along which a car, vehicle, bogie, transport apparatus can move along. As used herein, the term guideway and track are interchangeable and refer to the same element. A car refers to a device which is configured for travel along the guideway. The car can be at least partially enclosed, entirely enclosed or have a surface upon which objects or persons can be placed. The car can be coupled with a bogie which is in turn coupled with the guideway. The bogie can be an integral component of the car or a separate component to which the car can be coupled with. A bogie as used herein does not necessarily include wheels, but instead is configured for engagement with the guideway.

"Coupled" refers to the linking or connection of two objects. The coupling can be direct or indirect. An indirect coupling includes connecting two objects through one or more intermediary objects. Coupling can also refer to electrical or mechanical connections. Coupling can also include magnetic linking without physical contact. "Substantially" refers to an element essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. A "magnetic source" is any material that naturally produces a magnetic field or can be induced to generate a magnetic field. For example, a magnetic source can include a permanent magnet, an electromagnet, a superconductor, or the any other material that produces a magnetic field or can be induced to generate a magnetic field. The term "pitch" is defined as increasing or decreasing the angle of attack relative to a horizontal axis. The term "yaw" is defined as a twist or oscillation about a vertical axis.

The various embodiments described above are provided by way of illustration only and should not be construed to limit the scope of the disclosure. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached claims. It will therefore be appreciated that the embodiments described above can be modified within the scope of the appended claims. Claim language reciting "at least one of" a set indicates that one member of the set or multiple members of the set satisfy the claim. For example, at least one of A, B, and C, indicates the members can be just A, just B, just C, A and B, A and C, B and C, or A, B, and C.

A guideway switch is a piece of guideway that makes possible the splitting or merging of paths. A guideway switch is an important and valuable technological feature for constructing guideway networks of multiple lines of guideway. By switching a vehicle from one line to another, passengers or freight need not be transferred to another vehicle on the other line.

The present disclosure is directed to adjusting the orientation of a levitation generator within a corresponding lifting member. The orientation of the levitation generator can assist in switching of a vehicle between alternative paths in a guideway transportation system including segments of a track in which each track segment is comprised of a pair of coextensive and spaced guide rails. The orientation of the levitation generator can assist in switching paths by adjusting the lift and/or adjusting the direction of travel of a vehicle for maneuvers such as cornering in a guideway transportation system. In at least one embodiment, a guideway transportation system including segments of track in which each track segment is comprised of a pair of coextensive and spaced guide rails is implemented. The guide rails can be part of a network of guide rails interconnected through junctions. The guide rails can have a mainline that is diverges into additional guide rails. For example, a mainline can be a central artery of the network and have divergent rails that branch out to form the network.

The guide rails in each segment are spaced from each other by a constant distance and are generally coplanar in a horizontal or inclined plane or are banked over curves in a fashion similar to conventional railroad track. In contrast to monorail, such track is comprised of a pair of coextensive spaced guide rails capable of carrying heavier loads at high speeds because the weight and inertial forces from the loads are distributed over a wider area of the guideway. Also vehicles riding on top of co-extensive spaced rails have some advantages in ride stability, safety with respect to collisions with tall trucks passing under the guideway, operation in stations where the guideway is located on a ground plane, and walkways that can be on the ground plane and level with the guideway.

The rails in a divergent zone can diverge vertically, which is in a direction generally perpendicular to the plane of the track, such that there is no crossing of rails in the divergent zone. While the present disclosure references a divergent zone, the present disclosure also includes a merging zone which is the opposite of the divergent zone. The divergent zone can include the rails diverging into an upper rail set and a lower rail set. The direction need not be exactly perpendicular to be generally perpendicular. For example, the track could be in the shape of a curve and the rails can diverge in a direction that is normal to gravity. In at least one arrangement, a mainline of the network is in a horizontal plane over the divergent zone, and switching is done by routing vehicles to or from vehicle paths above or below the mainline. The lift is due to force from one or more eddy currents magnetically induced in the rails, so that the force generally increases with vehicle speed, and the magnets and the rails can be designed to carry at least twice the gross mass of the vehicle at normal operating velocity. In this case, each rail can split so that each half of the rail diverges vertically from the other half, and the gross mass of a vehicle passing through the divergent zone will still be levitated by a pair of the half-rails regardless of the selected path through the divergent zone.

A transport apparatus as described herein can include at least one levitation generator and at least one drive generator. The at least one levitation generator can be configured to generate a levitating magnetic flux, move within a corresponding at least one lifting member, and elevate above a rest position relative to the at least one lifting member in response to the levitating magnetic flux. The at least one drive generator can be configured to generate a driving magnetic flux, move within a corresponding at least one drive member, and laterally move relative to the at least one drive member in response to the driving magnetic flux. At least a portion of the at least one levitation generator is movable relative to the at least one drive generator.

As described herein, the levitation generator can be configured to lift a coupled vehicle in relation to a lifting member. The levitation generator can include: a shaped member configured to be magnetically coupled with the lifting member. The shaped member can have at least one elongate magnetic pole configured to generate a lifting flux field for intersecting at least a portion of the lifting member. The lifting flux can be dependent upon the motion of the at least one magnetic pole surface in a direction of travel and the angle of the at least one magnetic pole surface relative to the direction of travel. The at least one magnetic pole surface can include a plurality of magnetic sources. The produced lifting flux field can be independent of the relative position of the at least one levitation generator relative to the corresponding at least one lifting member. The at least one elongate magnetic pole can be oriented at an angle relative to the direction of relative motion of the at least one levitation generator to the at least one lifting member, such that a lifting force component is generated in a direction normal to the direction of relative motion. The angle can be a predetermined angle based on a magnetic force versus normal velocity constant $K_{FN}$, the relative velocity between the at least one levitation generator and the at least one lifting element, and the lifting force required. The angle can be a variable angle based on magnetic force versus normal velocity constant $K_{FN}$, the relative velocity between the at least one levitation generator and the at least one lifting element, and the lifting force required. The lifting force can be dependent upon a length of the at least one elongate magnetic pole relative to a width and a height of the elongate magnetic pole, such that the lifting force increases as the length is greater as compared to the width and height. The lifting force can be dependent upon the velocity of the elongate magnetic pole relative to the at least one lifting member, wherein a higher velocity produces greater lift. The at least one elongate magnetic pole can include a plurality of magnetic elements arranged in a row. The at least one elongate magnetic pole can include two elongate magnetic poles and each of the two elongate magnetic poles can include a plurality of magnetic elements arranged in a row. The levitation member can include electromagnetic magnets, permanent magnets, or a combination thereof. The present disclosure is focused on controlling the levitation generator so that the lift can be known and modified as needed. The ability to know the lift can be derived from sensors or known inputs into the system in which the levitation generator interacts. Furthermore, various embodiments are described that provide for altering the lift characteristics of a levitation generator. These embodiments are described separately, but the present disclosure contemplates that in at least one implementation two or more of the embodiments can be combined to achieve greater benefits. The embodiments are described separately for illustration and discussion of the principles related to that particular embodiment.

Additionally, a guideway is presented. The guideway can include: at least one lifting member; at least one drive member can be coupled to the at least one lifting member by a guideway coupling member; the at least one lifting member can be configured to receive a levitating magnetic flux generated by a corresponding at least one levitation generator; and the at least one drive member can be configured to receive a driving magnetic flux generated by a corresponding at least one drive generator. The at least one lifting member can include two lifting members. The at least two lifting members can be two tracks, each track having three sides. Each track can include a plurality of segments. The cross-section of each of the two tracks can be substantially rectangular. The at least one drive member can be substantially cylindrical in shape.

FIG. 1 illustrates a transport apparatus having a guideway with a levitation generator 106 received therein. A transport apparatus 100 can include a drive generator (not shown) and a levitation generator 106 capable of being received within a guideway 104. The drive generator is configured to generate a driving magnetic flux causing lateral movement of the transport apparatus 100. The drive generator is shown outboard of the levitation generator in FIG. 2. The present levitation generator 106 can be implemented with a drive generator that is either outboard or inboard of the levitation generator 106. Additionally, the present levitation generator 106 can be configured for substantially or at least partially vertical configurations for example in elevators. The principles described herein are generally presented with respect to a generally horizontal direction of travel, but the present technology can be applied to other directional travel.

The guideway 104 can include one or more lifting members 108. The levitation generator 106 is configured to move within a lifting member 108 and generate a levitating magnetic flux, elevating the lifting member above a rest position. The levitation generator 106 and the corresponding lifting member 108 are separated by a gap 166 (See FIG. 3). In at least one embodiment, the levitation generator 106 can be a substantially rectangular shaped body coupled with the transport apparatus 100 and configured to move within the lifting member 108. In other embodiments, the levitation generator 106 can be any shape configured to move within a corresponding lifting member 108 and generate a levitating magnetic flux.

Figure 6:
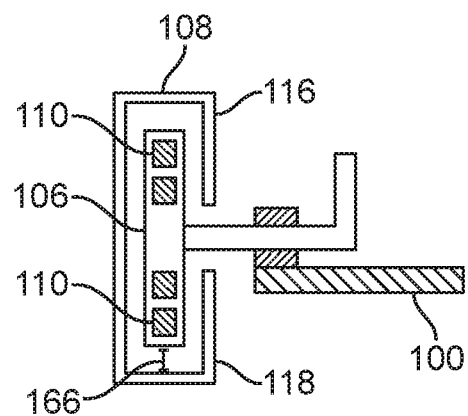
FIG. 6 a cross-sectional view of a second exemplary embodiment of an electromagnetic levitation generator and a lifting member.

In order to understand the placement of the lifting member 108 relative to the levitation generator, FIG. 6 is provided to illustrate the levitation generator 106 and lifting member 108 in cross section. The levitation generator 106 can include one or more magnetic elements 110 configured to generate the levitating magnetic flux as the levitation generator 106 moves within the corresponding lifting member 108. The magnetic element 110 can be one or more magnets. In at least one embodiment, the magnetic element 110 can be electromagnets. In other embodiments, the magnetic element 110 can include electromagnets, permanent magnets, or a combination thereof.

Referring again to FIG. 1, the guideway 104 includes a lifting member 108 forming a junction 112 between two lifting members 108. The levitation generator 106 is at least partially received within the lifting member 108. The junction 112 includes two lifting members 108 vertical arranged one above the other. As the transport apparatus 100 approaches the junction 112, the levitation magnetic flux can be increased or decreased, thereby increasing or decreasing the elevation above the lifting member 108. The transport apparatus 100 and levitation generator 106 can then enter either one of the vertically arranged lifting members 108. In at least one embodiment, the transport apparatus 100 can transition from two or more tracks to a single track, from a single track to more than one track, or from a plurality of tracks to a plurality of tracks. The transport apparatus 100 can have two levitation generators 106 disposed on opposing sides, each configured to be received within a lifting member 108. In at least one embodiment, the guideway 104 includes two opposing lifting members 108, each configured to receive a levitation generator.

The guideway 104 can include a junction 112 joining two lifting members 108, an upper lifting member 109 and a lower lifting member 111. The junction 112 can provide alternative directions of travel for the transport apparatus. For example, the upper lifting member 109 can form a curve to the right relative the direction of travel and the lower lifting member 111 can form a curve to the left relative to the direction of travel. In other embodiments, the upper lifting member 109 can curve left, curve right, continue vertical separation, level out, or any combination thereof, and the lower lifting member 111 can curve left, curve right, continue vertical separation, level out, or any combination thereof.

The transport apparatus 100 can navigate the junction 112 by varying the pitch of the levitation generator 106, thus increasing or decreasing the necessary levitating magnetic flux. The transport apparatus 100 can change the pitch the levitation generator 106 in various ways as will be discussed below. Additionally, as the transport apparatus 100 travels along a guideway 104 having a curve, bend, or other non-straight portion, the transport apparatus 100 can adjust the yaw of the levitation generator 106. The yaw can be adjusted separate from the pitch, and the transport apparatus 100 can adjust the yaw and pitch individually and simultaneously.

The guideway 104 has an upper rail 116 and a lower rail 118 that magnetically couple with upper and lower elongate magnetic elements 110 in the levitation generator 106. (See FIG. 6). In at least one embodiment, the levitation generator 106 is referred to as a "levitation wing" or "magwing."

The transport apparatus 100 can have a sensor wing 130. The sensor wing 130 can have one or more vertical position sensors (VPS) 132 to determine the levitation generator's 106 position within the guideway 104 and the corresponding lifting member 108. The data collected by the plurality of sensors 132 allows the levitation generator 106 to transition within the guideway 104 and junction 112. As can be appreciated in FIG. 1, the upper portion 134 with a sensor 132 disposed on an inner surface 136 and the lower portion 138 with a sensor 132 disposed on an inner surface 139.

The one or more VPS 132 can be mounted to the levitation generator 106 leading edge, on the bogie, on the sensor wing 130, or on an axle 128. The one or more VPS 132 can be of varied type, such as Hall Effect, proximity, optical, ultrasonic, field effect and other edge/position sensors commonly used in machinery automation. In at least one embodiment, the one or more VPS 132 can engage with and/or interact with to upper edge sensor 124 and/or the lower edge sensor 126.

The axle 128 can couple the levitation generator 106 with the transport apparatus 100. The axle 128 can have one or more servo motors 162 coupled therewith to slide or rotate the axle 128 relative to the transport apparatus 100. In at least one embodiment, the one or more servo motors 162 rotates the axle 128 about the longitudinal axis of the axle 128, thereby rotating the levitation generator 106. In other embodiments, the one or more servo motors 162 can slide the axle 128 along the longitudinal axis of the transport apparatus 100 relative to the levitation generator 106. In yet other embodiments, the one or more servo motors 162 can actuate the levitation generator 106 in any direction relative to the axle 128 and the transport apparatus 100, such as pitch, yaw, and/or roll.

Figure 2:
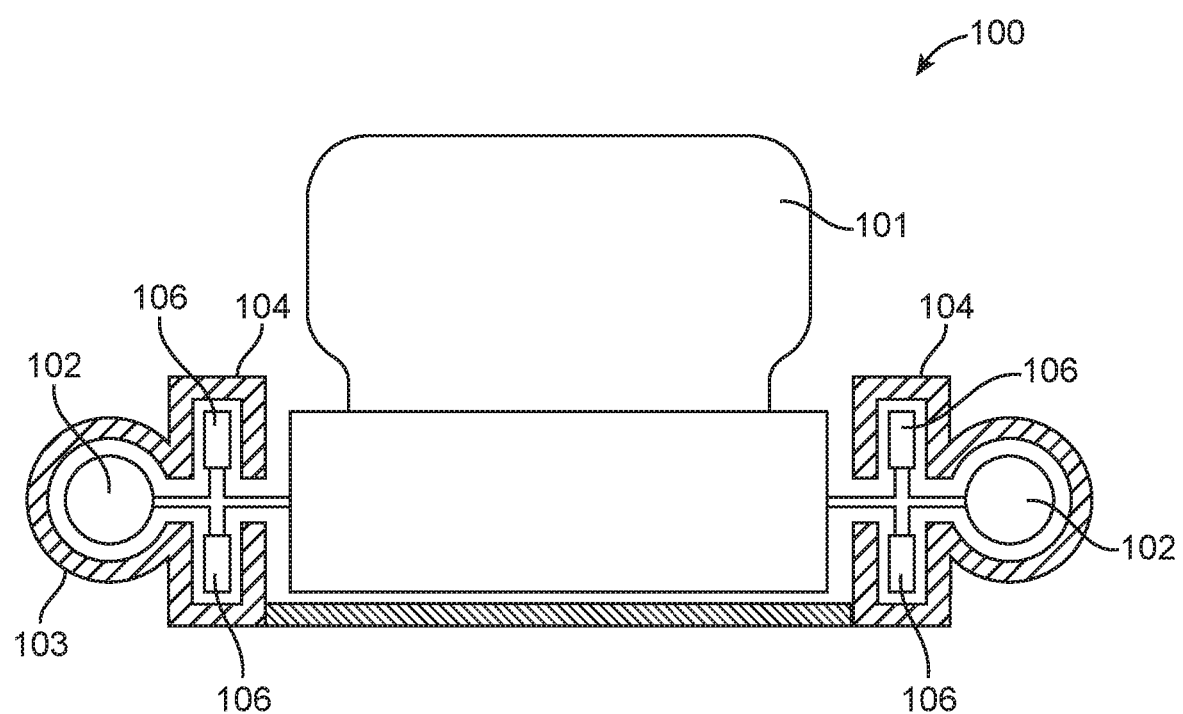
FIG. 2 is cross-sectional view of a specific example of a transport apparatus including a drive member and guideway.

FIG. 2 illustrates a specific example of a transport apparatus 100 and guideway 104. The transport apparatus 100 can include includes a vehicle 101 and disposed between two parallel-spaced horizontal rails of the guideway 104. The vehicle 101 can be configured to transport passengers, freight, or a combination thereof. The width of the vehicle 101 is less than the spacing between the rails to provide sufficient clearance between the cabin and the rails of an upper lifting member 109 (See FIG. 1) of a vertically divergent junction 112 (See FIG. 1). Levitation generators 106 are disposed within the rails and mounted to the vehicle 101. The levitation generator 106 can be passive permanent magnets or electromagnets, or they can include actively switched electromagnets.

As can be appreciated in FIG. 2, the transport apparatus 100 include a drive generator 102 configured to generator a drive magnetic flux. The drive generator 102 can be disposed on an outer edge of the vehicle and receivable within a drive member 103 disposed on the outer portion of each rail.

Figure 3:
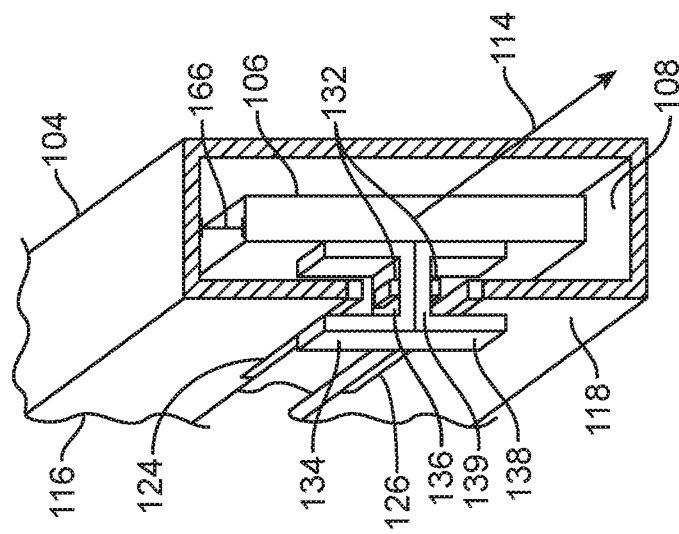
FIG. 3 is a cross-sectional view of an exemplary embodiment of a levitation generator and a lifting member.

FIG. 3 illustrates a cross-section of a levitation generator within a lifting member in accordance with the present disclosure. FIG. 3 illustrates the bottom edge 120 of the upper rail 116 has an upper edge sensor 124 configured to detect proximity of the sensor wing 130 and the levitation generator as the transport apparatus 100 approaches the junction. Similarly, the top edge 122 of the lower rail 118 has a lower edge sensor 126 configured to detect proximity of the sensor wing 130 and the levitation generator 106 as the transport apparatus 100 approaches the junction. The upper edge sensor 124 and the lower edge sensor 126 can be of varied type, such as Hall Effect, proximity, optical, ultrasonic, field effect and other edge/position sensors commonly used in machinery automation. The upper edge sensor 124 and the lower edge sensor 126 provide data regarding the direction of travel 114, the levitation generator and the lifting member 108 as the transport apparatus 100 transitions through the junction 112.

In at least one embodiment, the upper edge sensor 124 and the lower edge sensor 126 provide data to the transport apparatus 100 regarding proximity to adjust pitch of the levitation generator 106. The transport apparatus 100 can include a processor, microprocessor, or other control mechanism to adjust the levitation generator pitch in response to data from the sensor wing, the upper edge sensor 124 and/or lower edge sensor 126 data. The data can be implemented with an electromagnet controller described below (shown in FIG. 4). In other embodiments, the upper edge sensor 124 and the lower edge sensor 126 indicate the direction of travel 114 for the transport apparatus 100 as it transitions the junction 112. The upper edge sensor 124 and lower edge sensor 126 turn on and off to direct the transport apparatus 100 to the appropriate upper lifting member 109 or lower lifting member 111 (shown in FIG. 1).

The lifting member 108 has a substantially rectangular cross-section and the levitation generator 106 has a similarly shaped, but at least slightly smaller substantially rectangular cross-section configured to move within the lifting member 108. The levitation generator 106 generates the levitating magnetic flux as it moves within the lifting member 108 along the direction of travel 114. The sensor wing 130 is positioned ahead of the levitation generator 106. In at least one embodiment, the transport apparatus has a sensor wing 130 positioned forward and aft of the levitation generator 106.

Figure 4:
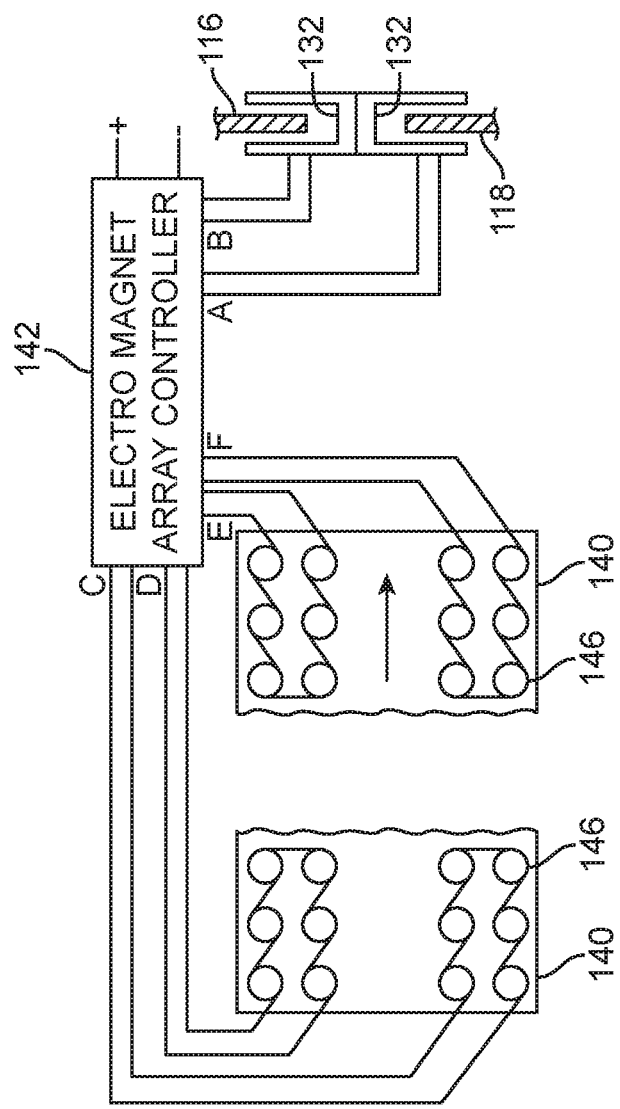
FIG. 4 is a diagrammatic view of an electromagnet array controller of a levitation generator according to an exemplary embodiment.

FIG. 4 illustrates an electromagnet array controller and a levitation generator according to an exemplary embodiment. The electromagnet array controller 142 can selectively respond to input from either the upper or lower VPS 132. The controller output is current directed to sets of electromagnet coils 146 in the levitation generator 106 to increase the magnetic coupling with the lifting member 108.

Since the electromagnet 140 can be positioned at a leading end or trailing end of the levitation generator 106, the effect of passing current through them has multiple effects. One effect is augmentation of the direct levitation by increasing the effective length of the levitation generator 106. The charging of the electromagnet elements 140 increases the length of the permanent magnetic pole that is coupling with the rail. The effect of energizing all the electromagnet elements 140 in a levitation generator 106 is rapid and linear change in the levitation flux.

The pitch moment balance of the levitation generator 106 can also be altered by the energizing of the electromagnet elements 140. Energizing the electromagnet elements 140 at the leading end of the levitation generator 106 causes increased pitch (incline). Energizing the electromagnet elements 140 at the trailing end of the levitation generator 106 results in decreased pitch (decline). Similarly, energizing the electromagnet elements 140 at the leading end of the levitation generator 106 can cause decreased pitch (decline) and energizing the electromagnet elements 140 at the trailing end of the levitation generator 106 results in increased pitch (incline).

As can be appreciated in FIG. 4, the levitation generator 106 has four electromagnetic elements 140, each electromagnetic element 140 having six electromagnetic coils 146. The electromagnet array controller 142 energizes the appropriate electromagnetic element 140 and the corresponding electromagnetic coils 146 in response to feedback from the plurality of sensors 132. The electromagnet elements 140 at the leading edge of the levitation generator 106 are indicated as E and F while the electromagnet elements 140 at the trailing edge of the levitation generator 106 are indicated as C and D. In at least one embodiment, the elongate magnetic pole is disposed between the leading edge elements E, F and trailing edge elements C, D.

In other embodiments, the levitation generator 106 can have more or less electromagnetic elements, and each electromagnetic element 140 can have more or less electromagnetic coils 146 within each electromagnetic element 140. The number of electromagnetic elements 140 and electromagnetic coils 146 can vary depending on factors such as, but not limited to, the size of the levitation generator 106, electromagnetic coils 146, material selection available power.

Figure 5:
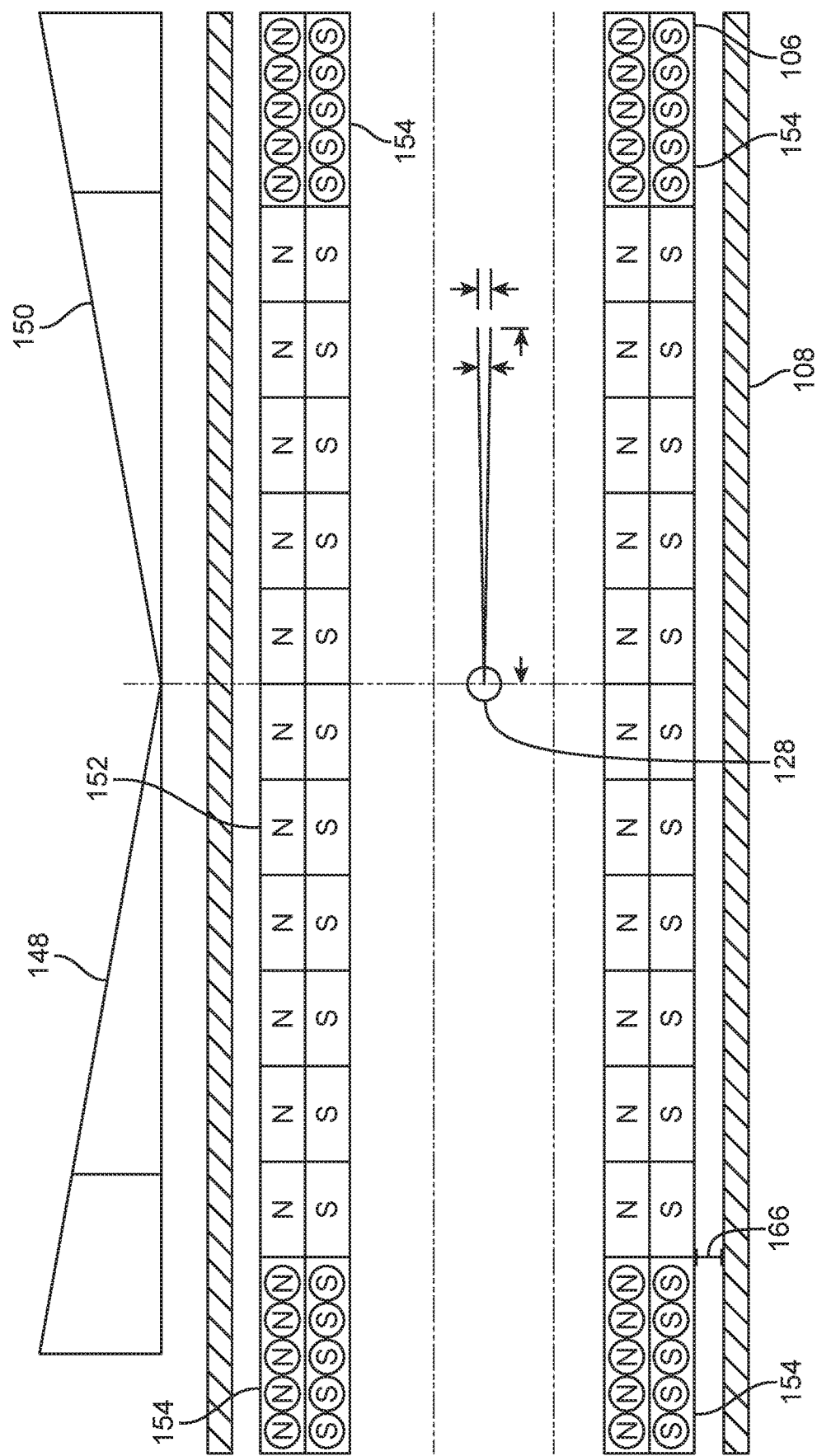
FIG. 5 is a diagrammatic view of an electromagnetic levitation generator according to an exemplary embodiment.

FIG. 5 illustrates a diagrammatic view of a lifting member with permanent magnet elements and electromagnet elements. The sidewall of the guideway 104 and the levitation generator 106 are not shown to better illustrate the construction of the levitation generator 106. The magnetic elements 110 of the levitation generator 106 can be divided into a forward portion 148 and an aft portion 150. Each portion can have a permanent magnet zone 152 and an electromagnet zone 154. The levitation generator can pitch about the axle 128 in response to an imbalanced energizing of electromagnet zone. Energizing the electromagnetic zone 154 of the forward portion 148 increases the pitch (incline) of the levitation generator 106 and energizing the electromagnetic zone 154 of the aft portion 150 decreases the pitch (decline) of the levitation generator 106.

The levitation generator 106 can have a permanent magnet zone 152 and an electromagnet zone 154 can be implemented with the electromagnet array controller 142 shown and described in FIG. 4 above. The permanent magnet zone 152 can generate the necessary levitating magnetic flux while the electromagnet zone 154 can provide pitch adjustment as the levitation generator 106 travels within the corresponding lifting member 108.

FIG. 6 illustrates a cross-section view of a levitation generator. The electromagnet zone 154 is within the forward portion 148 of the levitation generator 106. The levitation generator 106 can have an upper and lower electromagnet zone 154 within the forward portion 148 and similarly include an upper and lower electromagnet zone 154 in the aft portion 150 of the levitation generator.

As can be appreciated in FIGS. 5 and 6, the levitation generator 106 has five electromagnetic coils 146 in each of the upper and lower portion of the forward portion 148 and of the aft portion 150, each coil having a north pole and a south pole. The permanent magnet zone 152 has six permanent magnetic elements 156 in each of the upper portion and lower portion of the forward portion 148 and six permanent magnetic elements 156 in each of the upper portion and lower portion of the aft portion 150. The levitation generator 106 is substantially level, but energizing an electromagnet zone 154 can cause the levitation generator 106 to pitch about the axle 128 within the guideway 104.

Figure 7:
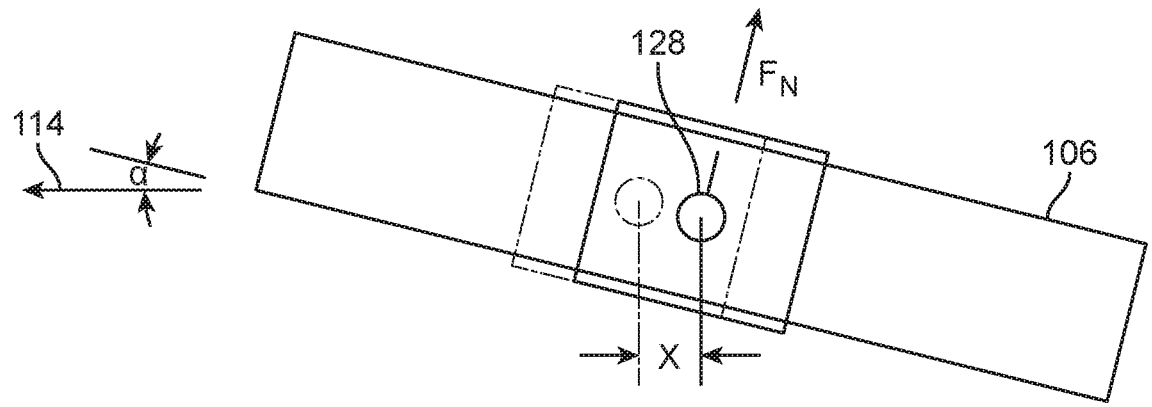
FIG. 7 is a diagrammatic view of a levitation generator having a slidable axle configured to vary pitch according to an exemplary embodiment.

FIG. 7 illustrates a slidable levitation generator according to an exemplary embodiment. The levitation generator 106 increases and decreases the pitch to adjust the levitating magnetic flux as it approaches and passes through a junction 112. The levitation generator 106 can adjust pitch by sliding the axle forward or aft altering the result normal force. The levitation generator 106 is balanced at the center point about the axle 128. In at least one embodiment, a servo motor and/or linkage (shown in FIGS. 1 and 9-11) can slide the axle aft of center point increasing the pitch by α. The torque acting upon the levitation generator 106 is the levitation force in a steady state $F_N$ multiplied by the distance the axle is moved from the center X. In other embodiments, a servo motor and/or linkage (shown in FIGS. 1 and 9-11) can slide the levitation generator 106 forward or aft relative to the axle 128, thereby creating an unbalanced levitation flux changing the pitch of the levitation generator.

As can be appreciated in FIG. 7, the axle 128 is shifted distance X aft of the center causing the levitation generator 106 to pitch upward by α. In order to illustrate the calculation, the $F_N$ is one hundred (100) kg and the axle is shifted one (1) cm the resulting torque acting upon the levitation generator is one (1) kgm. The resulting torque increases the pitch of the levitation generator 106. In other embodiments, the axle can be shifted forward of the center point decreasing the pitch of the levitation generator 106. The example is only an example and the values illustrated are only for ease of understanding. Different values can be used to perform the calculation. The values are dependent upon the system.

Figure 8:
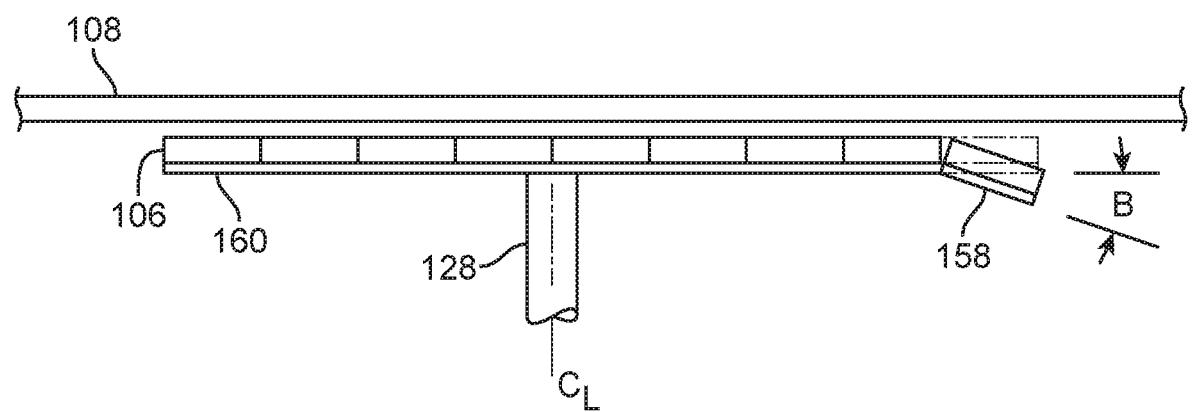
FIG. 8 is diagrammatic view of a levitation generator having a pivotable segment configured to vary pitch according to an exemplary embodiment.

FIG. 8 illustrates a top down diagrammatic view of a levitation generator according to an exemplary embodiment. The levitation generator 106 includes a plurality of magnetic elements 110 arranged along the length of the levitation generator 106. One or more of the magnetic elements 110 can be pivotable magnetic elements 158 coupled to the levitation generator 106. The pivoting of a magnetic element 158 alters the levitation flux generated by the levitation generator 106 interacting with the corresponding lifting member 108 causing the levitation generator 106 to rotate about the axle 128.

The pivotable magnetic element 158 adjusts the magnetic flux generated on either side of the axle 128 causing the levitation generator 106 to pitch. Pivoting the magnetic element 158 at the trailing end causes the levitation generator 106 to have a higher generated magnetic flux on the leading end, thus the levitation generator 106 pitches up (inclines). Pivoting a magnetic element 158 at the leading end causes the levitation generator 106 to have a higher generated magnetic flux on the trailing end, thus the levitation generator 106 pitches down (declines). The levitation generator 106 can pivot the one or more pivotable magnetic elements 158 in response to feedback from the upper edge sensor 124, the lower edge sensor 126, the VPS 132, and the processor of the transport apparatus 100.

As can be appreciated in FIG. 8, the levitation generator 106 is coupled by an axle 128 disposed at substantially the center point of the levitation generator 106. The levitation generator 106 has a plurality of magnetic elements 110 with one or more of the magnetic elements 110 being pivotably coupled to the levitation generator. The levitation generator 106 can further have a magnetically permeable back plate 160 upon which the magnetic element 110 can be disposed. The magnetically permeable back plate 160 is also pivotably attached to the pivotable magnetic elements 158. The magnetically permeable back plate 160 can be iron, ferritic stainless steel, carbon steel, or any other magnetically permeable material. The trailing magnetic element 110 of the levitation generator 106 is the pivotable magnetic element 158 and transitions away from the corresponding lifting member 108, thereby increasing the pitch of the levitation generator 106. The leading element can also be pivotably coupled to transition away from the corresponding lifting member 108, thereby decreasing the pitch of the levitation generator 106. The pivotable magnetic element 158 can be controlled by the processor or microprocessor of the transport apparatus 100 in response to upper edge sensor 124, lower edge sensor 126, VPS 132, or other sensors disposed on the levitation generator 106 or corresponding lifting member 108. In other embodiments, more than one pivotable magnetic element 158, such as two, three or more, can be implemented to provide additional changes in pitch.

Figure 9:
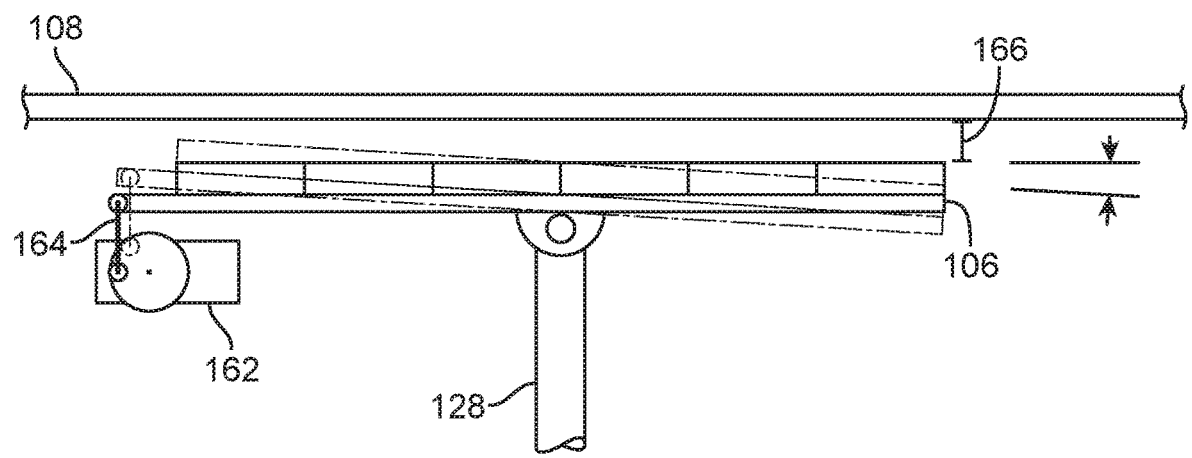
FIG. 9 is a diagrammatic view of a levitation generator pivotably coupled to a yaw axle according to an exemplary embodiment.

FIG. 9 illustrates a top down diagrammatic view of a levitation generator. The transport apparatus 100 can require adjustment in both pitch and yaw. Pitch adjusts the incline or decline of the levitation generator 106 relative to the direction of travel 114, while yaw adjusts the twisting of the levitation generator 106 about an axis perpendicular to the direction of travel 114. Adjusting yaw changes the direction of travel within a horizontal plane while pitch adjusts direction of travel within a vertical plane.

The yaw of the levitation generator 106 is adjustable by altering the gap 166 between the one or more magnetic elements 110 and the corresponding lifting member 108. The levitation generator 106 is pivotably coupled with the axle 128. The levitation generator can also be coupled with a servo motor 162 and a linkage 164. The servo motor 162 and linkage 164 can pivot the levitation generator 106 relative to the corresponding lifting member 108. As the servo 162 actuates the levitation generator 106 pivots and the gap 166 between the levitation generator 106 and the corresponding lifting member 108 changes, thus the levitating magnetic flux changes.

As the gap 166 changes, the resulting moment acts to increase or decrease the pitch of the levitation generator 106 depending on the direction of yaw. A smaller gap 166 at the leading edge of the levitation generator 106 increases pitch, while a larger gap 166 at the leading edge of the levitation generator decreases pitch. Similarly, a smaller gap 166 at the trailing edge of the levitation generator 106 decreases pitch, while a larger gap 166 at the trailing edge of the levitation generator increases pitch.

As can be appreciated in FIG. 9, the servo motor 162 and linkage 164 are coupled with the leading end of the levitation generator 106. The gap 166 is consistent relative to the corresponding lifting member 108. The dashed levitation generator 106 illustrates an induced yaw. The servo motor 162 actuates moving the leading end closer to the lifting member 108 shrinking the gap 166 between the levitation generator 106 and the lifting member 108, thus inducing an increase in pitch. In other embodiments, the servo motor 162 and linkage 164 can be coupled at the trailing edge of the levitation generator 106, or at any point along the length of the levitation generator 106 to adjust pitch.

Figure 10:
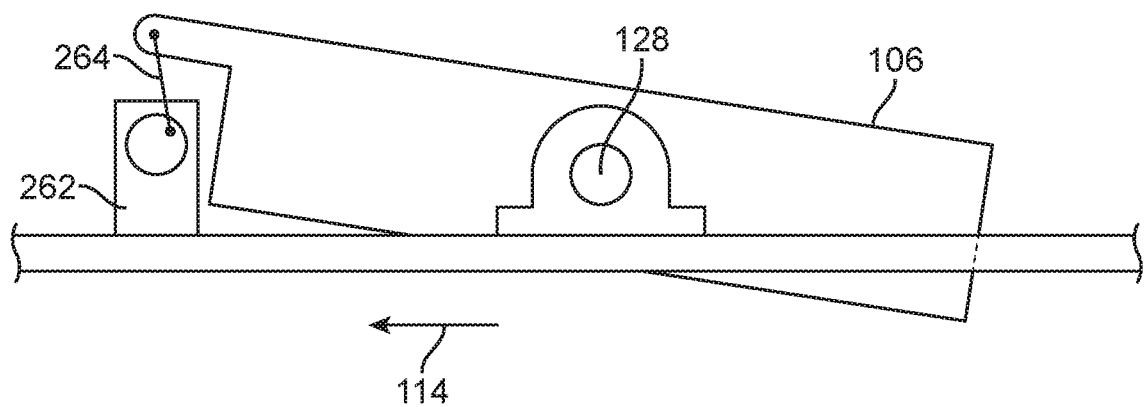
FIG. 10 is a diagrammatic view of a levitation generator pivotably coupled to a pitch axle according to an exemplary embodiment.

FIG. 10 illustrates a diagrammatic view of a levitation generator according to the present disclosure. The levitation generator 106 can be coupled with a servo motor 262 and linkage 264 to adjust pitch. The servo motor 262 and linkage 264 pivot the levitation generator 106 directly adjusting the pitch. As can be appreciated in FIG. 10, the servo motor 262 is coupled with the leading edge of the levitation generator 106. The levitation generator 106 is pitched up relative to the direction of travel 114. The leading edge of the levitation generator can be pitched up toward the upper lifting member 109 and pitched down toward the lower lifting member 111. In other embodiments, the servo motor 262 and the linkage 264 can be coupled with any point along the levitation generator. Coupling with the leading or trailing end can maximize the pitch range for the levitation generator 106. In other embodiments, the servo motor 262 and linkage 264 can be coupled at the trailing edge of the levitation generator 106, or at any point along the length of the levitation generator 106 to adjust the gap 166.

Figure 11:
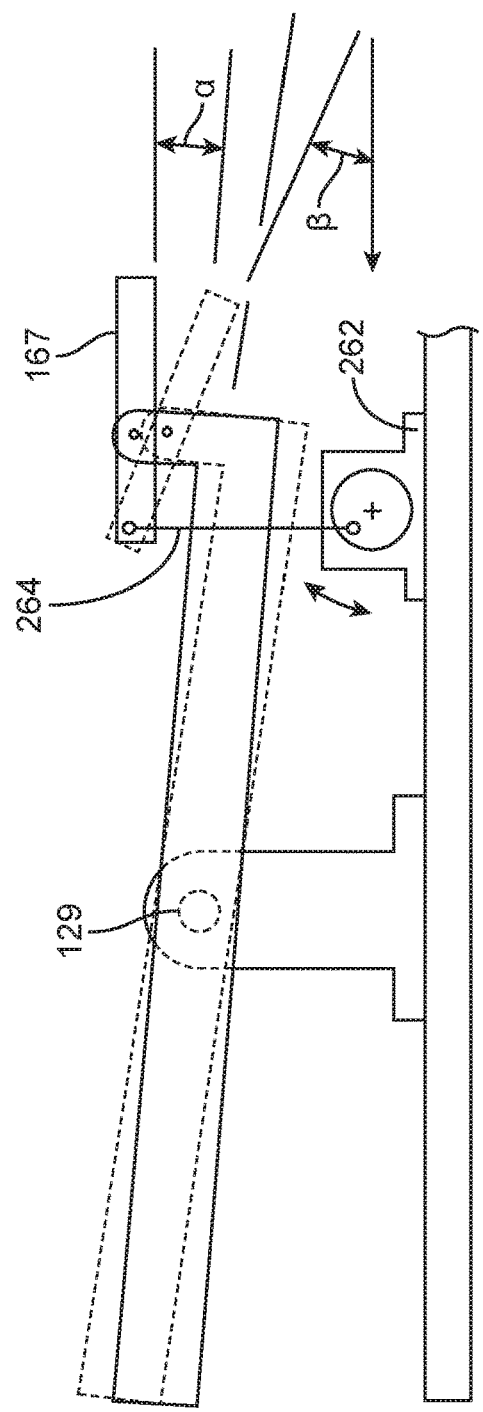
FIG. 11 is a diagrammatic view of a levitation generator having pivotable trim tabs configured to adjust the yaw, thereby vary pitch according to an exemplary embodiment.

FIG. 11 illustrates a top down view of a levitation generator 106 having a single trim tab according to the present disclosure. The levitation generator 106 includes a trim tab 167 coupled to the levitation generator 106 by a lightweight servo motor 262. The levitation generator 106 is pivotable about a center point 129. The servo motor 262 can adjust the yaw of the trim tab 167 out of alignment with the direction of travel 114. A reactionary force causes pitching of the levitation generator 106 by rotating the levitation generator 106 about the center point 129, such that the trim tab 167 returns to alignment within the direction of travel 114. The pitch angle $\alpha_{LG}$ of the levitation generator 106 is increased (or decreased) to pitch angle $\alpha'$ by pitching the trim tab by $\alpha_{TT}$ relative to the levitation generator 106. The angle between the direction of travel 114 and the trim tab 167 upon return to alignment is $\beta$. When the trim tab 167 is aligned with the direction of travel 114, the levitation generator 106 is in a pitch moment balance.

The implementation as described in relation to FIG. 11 allows for a lighter weight servo motor 362 and as the servo motor 362 only needs to adjust the trim tab 167. The implementation is also self-stabilizing. In at least one embodiment the trim tab 167 is a mini levitation generator, or mini levitation wing.

Figure 12:
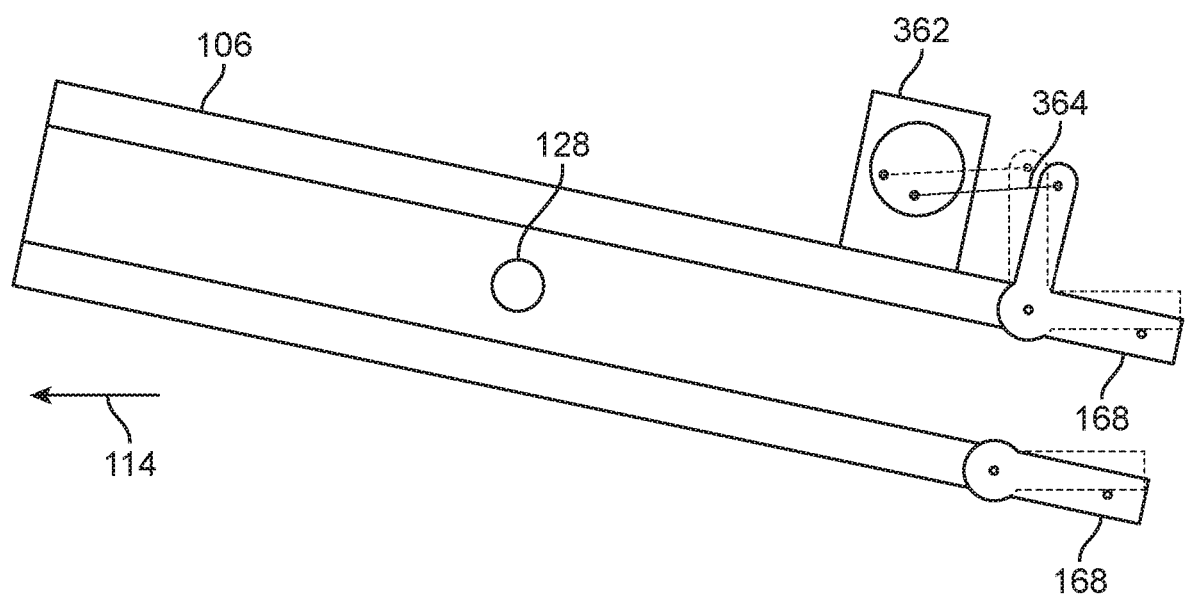
FIG. 12 is a diagrammatic view of a levitation generator having a pivotable trim tabs to vary pitch according to an exemplary embodiment.

FIG. 12 illustrates a diagrammatic view of a levitation generator according to the present disclosure. The levitation generator 106 can have two trim tabs 168 coupled with a servo motor 362 and linkage 364 to adjust pitch. During travel in the direction of travel 114 and with zero pitch, the trim tabs remain substantially parallel to the levitation generator 106. The trim tabs 168 can pivot toward and away from the upper rail 116 and lower rail 118 (shown in FIG. 3) to adjust pitch. Pivoting of the trim tabs 168 toward or away from the corresponding lifting member causes the levitation generator to pivot about the axle 128. The trim tabs 168 pivoted toward the upper lifting member 109 increases pitch of the levitation generator 106, while the trim tabs 168 pivoted toward the lower lifting member 111 decreases pitch of the levitation generator 106.

As can be appreciated in FIG. 12, the trim tabs 168 are disposed at the trailing edge of the levitation generator 106 and pivoted upward toward the upper rail 116 causing the levitation generator 106 to pitch up. In other embodiments, the levitation generator 106 can include one trim tab 168, two trim tabs 168, or any number of trim tabs 168 disposed at either the leading end or training end to adjust pitch within the corresponding lifting member 108.

In other embodiments, the levitation generator 106 can include a trim tab 168 coupled to the levitation generator 106 by a servo motor 362. The servo motor 362 can pitch the trim tab out of alignment with the direction of travel 114. A reactionary force pitches the levitation generator 106 such that the trim tab 168 returns to alignment with the direction of travel 114.

Figure 13:
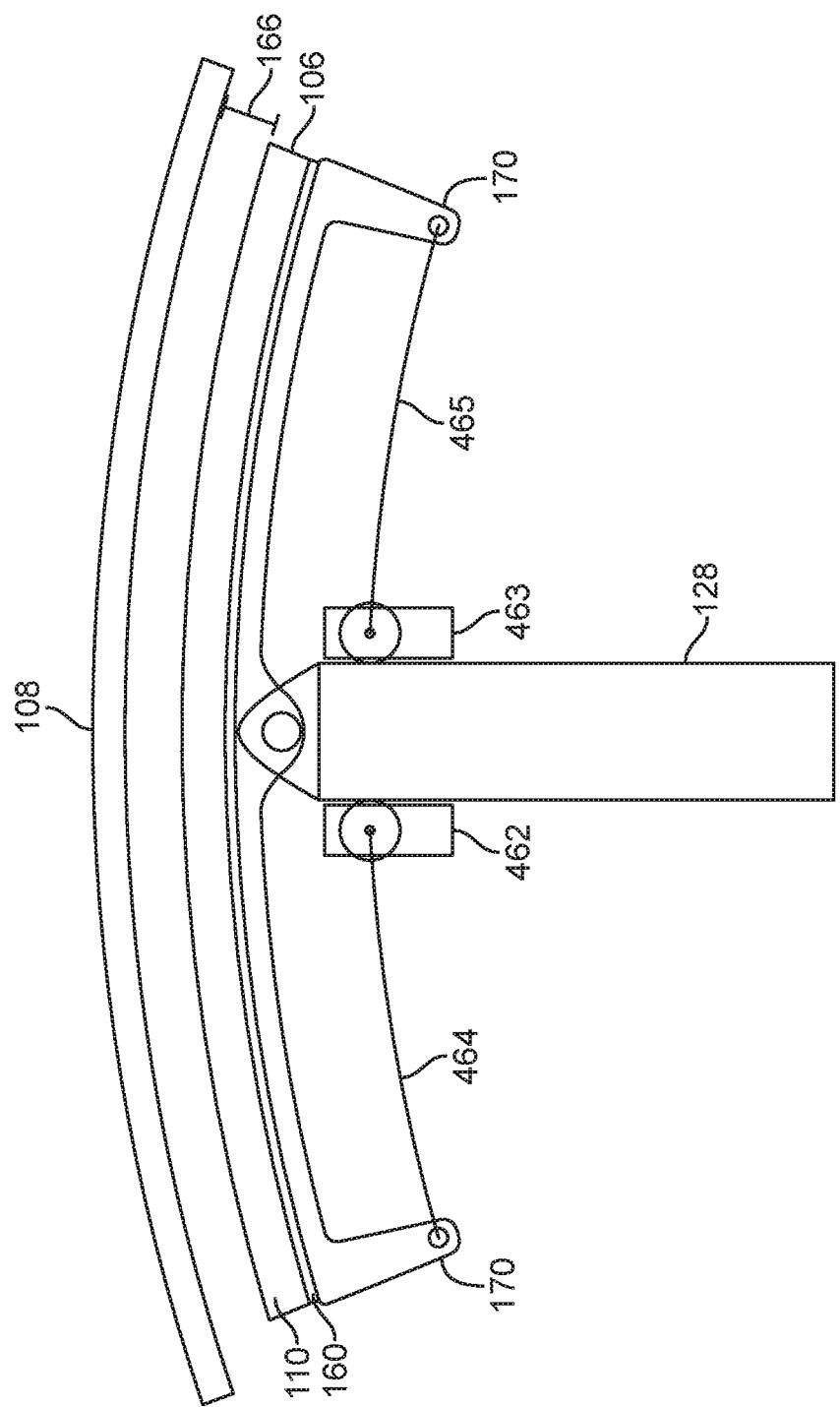
FIG. 13 is a diagrammatic view of a bendable levitation generator coupled to an axle and a corresponding lifting member according to an exemplary embodiment.

FIG. 13 illustrates a flexible levitation generator 106 according to the present disclosure. The levitation generator 106 is coupled with two servo motors 462, 463 and two linkages 464, 465 disposed on either side of the axle. The linkages 464, 465 couple the servo motors 462, 463 with the leading end and trailing ends of the levitation generator 106. The servo motors 462, 463 deflect the ends of the levitation generator 106 maintaining a constant gap 166 between the levitation generator 106 and the corresponding lifting member. Maintaining a constant gap 166 regulates the levitating magnetic flux and allows for active control of the levitation generator 106.

As can be appreciated in FIG. 13, the levitation generator 106 includes protrusion 170 coupling the levitation generator 106 with the servo motors 362, 363. The servo motors 362, 363 are disposed on the axle substantially in line with the protrusions 170. In other embodiments the servo motors 362, 363 can be disposed on the axle away from the levitation generator creating an angled linkage relative to the levitation generator 106.

FIG. 14 illustrates a levitation generator according to the present disclosure. The levitation generator 106 can have two segments 1061, 1062 pivotably coupled at the axle 128. The segments 1061, 1062 can be coupled with the axle 128 by servo motors 462, 463 and linkages 464, 465. The servo motors 462, 463 and each segment 1061, 1602 of the levitation generator 106 relative to the corresponding lifting member 108.

FIG. 15 illustrates an axle coupling according to the present disclosure. The axle coupling 172 couples the levitation generator 106 with the axle 128. The axle coupling 172 allows the levitation generator 106 pitch up, pitch down, to yaw left, and to yaw right.

Figure 16:
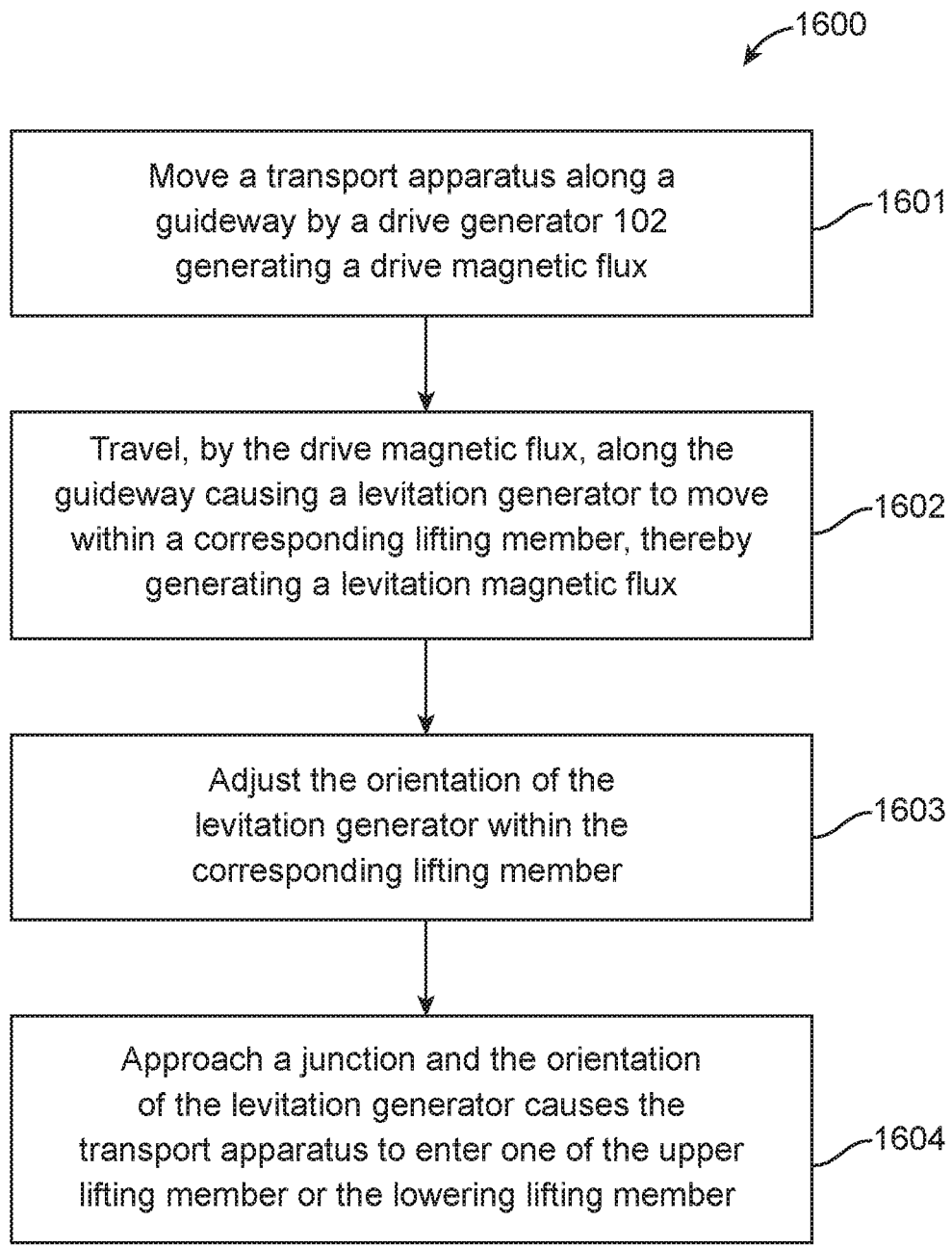
FIG. 16 is a flowchart of a method of using a transport apparatus.

FIG. 16 illustrates a flowchart of a method of using a transport apparatus. Referring to FIG. 16, a flowchart is presented in accordance with an example embodiment. The example method 1600 is provided by way of example, as there are a variety of ways to carry out the method. The method 1600 described below can be carried out using the configurations illustrated in FIGS. 1-15, for example, and various elements of these figures are referenced in explaining example method 1600. Each block shown in FIG. 16 represents one or more processes, methods or subroutines, carried out in the example method 1600. Furthermore, the illustrated order of blocks is illustrative only and the order of the blocks can change according to the present disclosure. Additional blocks may be added or fewer blocks may be utilized, without departing from this disclosure. The example method 1600 can begin at block 1601.

At block 1601, a transport apparatus 100 can move along a guideway 104 by a drive generator 102 generating a drive magnetic flux. In at least one embodiment, the drive generator 102 is helical and rotating within a corresponding drive member.

At block 1602, the drive magnetic flux causes travel along the guideway 104 causing a levitation generator 106 to move within a corresponding lifting member 108, thereby generating a levitation magnetic flux. The levitation magnetic flux varies with velocity of the transport apparatus 100 along the guideway 104.

At block 1603, the transport apparatus 100 adjusts the orientation of the levitation generator 106 within the corresponding lifting member 108. The orientation, including pitch, yaw, and/or roll, varies the levitating magnetic flux.

At block 1604, the transport apparatus 100 approaches a junction 112 and the orientation of the levitation generator 106 causes the transport apparatus 100 to enter one of the upper lifting member 109 or the lower lifting member 111.

It is believed the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiments of the disclosure.

What is claimed is:

1. A transport apparatus comprising:
a levitation generator configured to:
generate a levitating magnetic flux from a plurality of permanent magnets each having a magnetic pole;
move within a corresponding lifting member in response to the levitating magnetic flux, wherein the corresponding lifting member is an electrically conductive, non-magnetic material;
adjust a direction of travel of the levitation generator by adjusting an angle of one or more of the plurality of permanent magnets; and
a drive generator configured to:
generate a driving magnetic flux; and
move within a corresponding drive member in response to the driving magnetic flux,
wherein the levitation generator has two trim tabs at a trailing end, the two trim tabs coupled with a servo motor which is configured to actuate the trim tabs about an axis perpendicular to a longitudinal axis of the transport apparatus.

2. The transport apparatus of claim 1, further comprising a second levitation generators and each levitation generator configured to be received in a corresponding lifting member.

3. The transport apparatus of claim 1, wherein the transport apparatus further comprises a body coupled with the levitation generator, the levitation generator is slidable relative to the body along a direction substantially parallel to the longitudinal axis of the transport apparatus.

4. The transport apparatus of claim 1, wherein the levitation generator is formed of a plurality of segments, at least one segment can be pivoted toward the transport apparatus, thereby altering the levitating magnetic flux.

5. The transport apparatus of claim 4, wherein the at least one segment is a trailing segment relative to a direction of relative motion of the transport apparatus.

6. The transport apparatus of claim 1, wherein the levitation generator is further configured to: elevate above a rest position relative to the corresponding lifting member in response to the levitating magnetic flux.

7. The transport apparatus of claim 1, wherein each trim tab is coupled with a corresponding servo motor, thereby allowing each trim tab to be moved individually.

8. The transport apparatus of claim 1, wherein the levitation generator has two opposing ends, and each end is coupled with a linkage to a servo motor disposed on an axle, the linkage and servo motor configured to cause the end of the at least one levitation generator to deflect relative to the longitudinal axis of the transport apparatus.

9. The transport apparatus of claim 8, wherein each end of the at least one levitation generator is deflectable independently of the opposing end.

10. A levitation wing compromising:
a levitation generator configured to:
couple with a transport apparatus;
generate a levitating magnetic flux from a plurality of permanent magnets each having a magnetic pole;
adjust a direction of travel of the levitation generator by adjusting an angle of one or more of the plurality of permanent magnets;
wherein the levitation generator is operable to move within a corresponding lifting member in response to the levitating magnetic flux, wherein the corresponding lifting member is an electrically conductive, non-magnetic material,
wherein the levitation generator has two trim tabs at a trailing end, the two trim tabs coupled with a servo motor which is configured to actuate the trim tabs about an axis perpendicular to a longitudinal axis of the transport apparatus.

11. The levitation wing of claim 10, wherein the levitation generator is coupled with a servo motor configured to actuate the levitation generator, thereby adjusting a pitch angle between a longitudinal axis of the levitation generator and the longitudinal axis of the transport apparatus.

12. The levitation wing of claim 10, wherein each trim tab is coupled with a corresponding servo motor, thereby allowing each trim tab to be moved individually.

13. A method comprising:
generating a levitating magnetic flux from a plurality of permanent magnets each having a magnetic pole;
moving a levitation generator of a transport apparatus within a corresponding lifting member in response to the levitating magnetic flux, wherein the corresponding lifting member is an electrically conductive, non-magnetic material, wherein the levitation generator has two trim tabs at a trailing end, and the two trim tabs are coupled with a servo motor;
actuating the servo motor to rotate the trim tabs about an axis perpendicular to a longitudinal axis of the transport apparatus;
adjusting a direction of travel of the levitation generator by adjusting an angle of one or more of the plurality of permanent magnets; and
generating a driving magnetic flux to move a drive generator of the transport apparatus within a corresponding drive member.

14. The method of claim 13, further comprising elevating the levitation generator above a rest position relative to the corresponding lifting member in response to the levitating magnetic flux.

15. The method of claim 13, further comprising adjusting a gap between the levitating generator and the corresponding lifting member.

* * * * *